Figure 3:
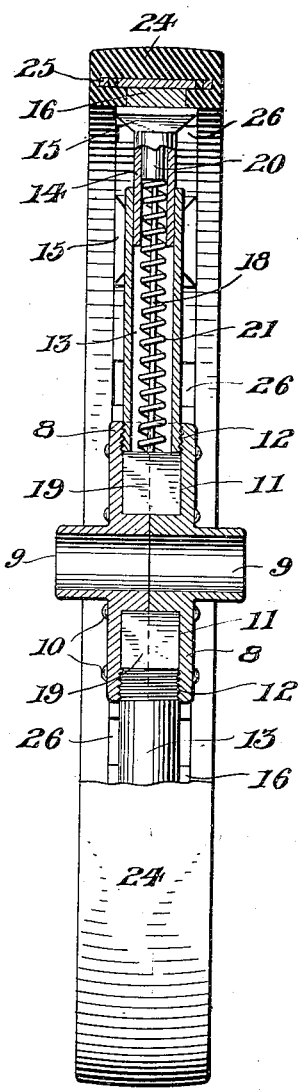

G. E. WASON.
SPRING WHEEL.
APPLICATION FILED MAY 10, 1919.
1,330,504. Patented Feb. 10, 1920.
2 SHEETS—SHEET 1.
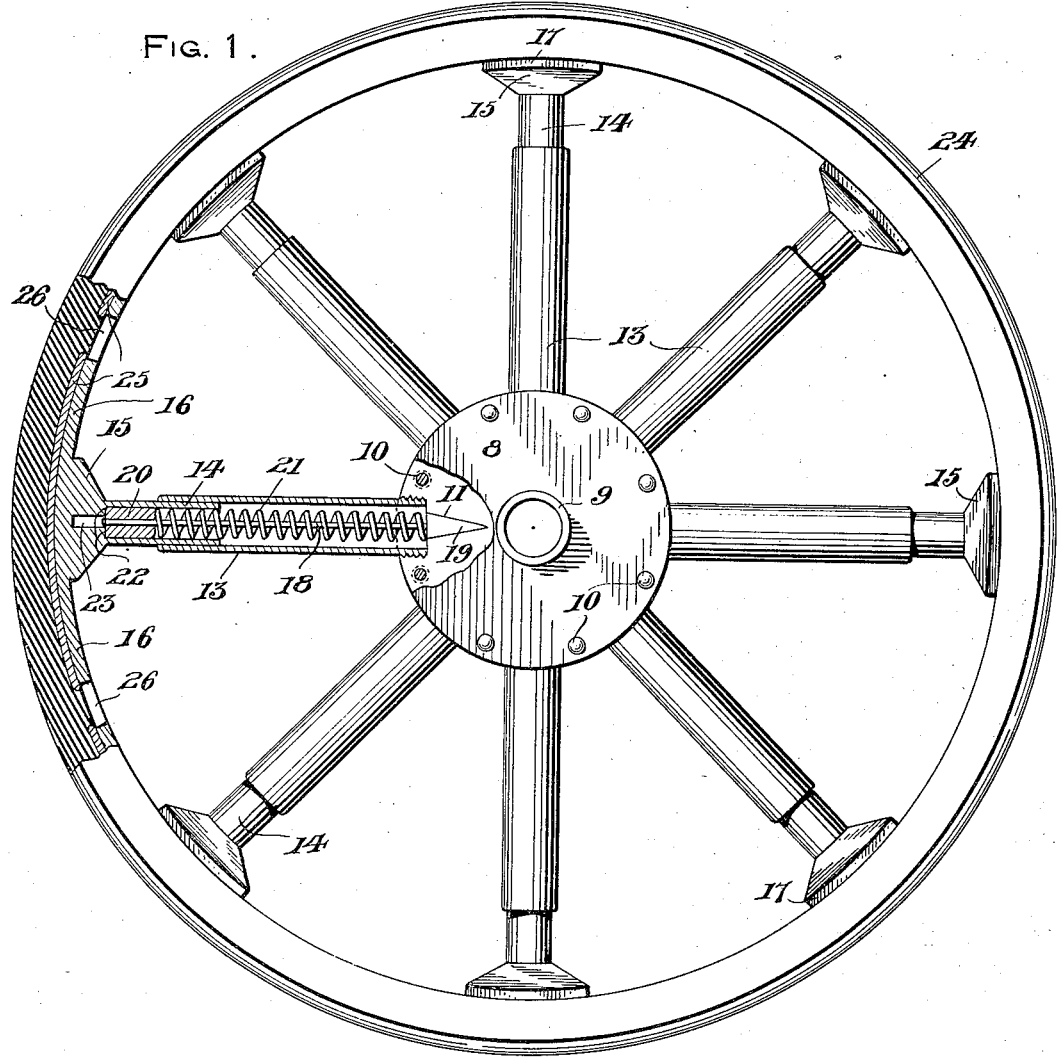
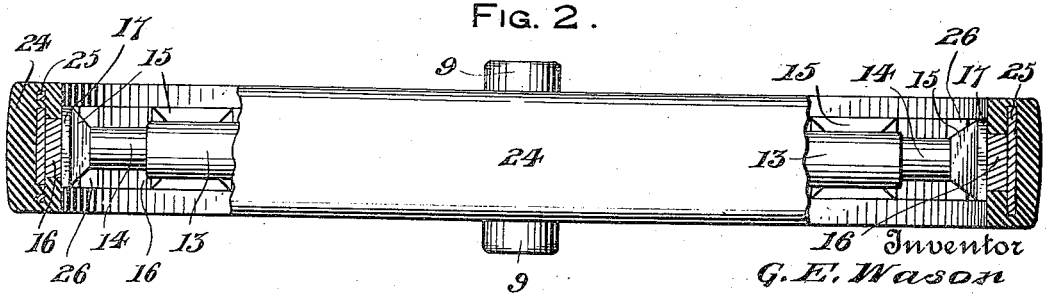
Inventor
G. E. Wason
By [signature]
Attorney

G. E. WASON.
SPRING WHEEL.
APPLICATION FILED MAY 10, 1919.

1,330,504.

Patented Feb. 10, 1920.
2 SHEETS—SHEET 2.

Inventor
G. E. Wason

By
N. M. Wilson
Attorney

UNITED STATES PATENT OFFICE.

GEORGI E. WASON, OF SAULT STE. MARIE, ONTARIO, CANADA, ASSIGNOR OF ONE-HALF TO PITE HAWRYLINK, OF SAULT STE. MARIE, CANADA.

SPRING-WHEEL.

1,330,504.　　　　　　Specification of Letters Patent.　　Patented Feb. 10, 1920.

Application filed May 10, 1919. Serial No. 296,093.

*To all whom it may concern:*

Be it known that I, GEORGI E. WASON, a citizen of Ukraine, residing at Sault Ste. Marie, in the Province of Ontario and Dominion of Canada, have invented certain new and useful Improvements in Spring-Wheels, of which the following is a specification.

The primary object of the present invention is to provide a spring wheel especially constructed for use upon automobiles wherein the resilient means is arranged within the spoke of the wheel while a movement of the wheel tread relative to the resilient spokes is permitted whereupon the pulling strain upon the tire is loosened.

A further object of the invention is to provide a spring wheel in which the resilient members therefor are arranged within the spokes and wherein shoes are carried by the outer ends of the spokes and have a slight movement relative to the engaging tread of the wheel.

In the drawings, forming a part of this application in which like reference characters indicate corresponding parts throughout the several views, Figure 1 is a side elevational view of the wheel constructed in accordance with the present invention, part of the same being broken away and shown in section to illustrate the construction of one of the spokes and the adjacent tread portion of the wheel.

Figure 4:
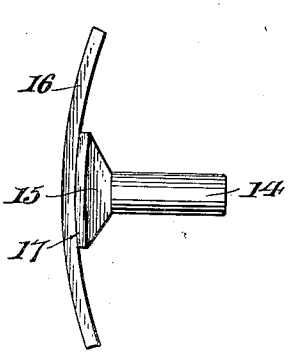
Figure 5:
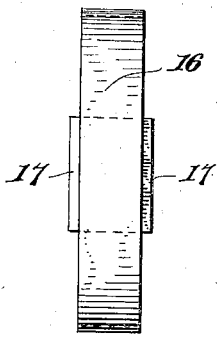
Figure 6:
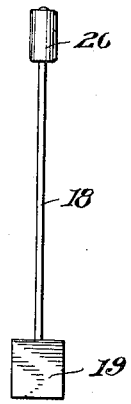
Figure 7:
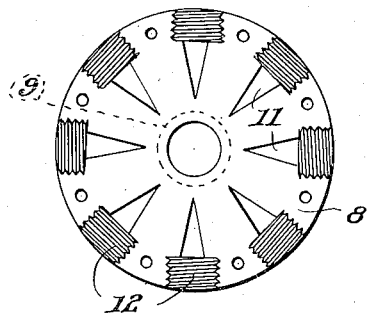

Fig. 2 is an edge view of the wheel with the opposite ends thereof broken away to show the method of embodying spoke shoe engaging plates in the tire, Fig. 3. is an edge view of the wheel partly broken away and shown in section, Fig. 4 is a side elevational view of one of the spoke shoes detached from the wheel, Fig. 5 is a front elevational view thereof, Fig. 6 is a detail view of one of the spoke rods removed from the wheel, and Fig. 7 is a side elevational view of one of the hub sections, Describing the invention more in detail, the reference numeral 8 designates a pair of skeleton hub sections having the alined bearings 9 and retained in assembled position by the connecting bolts 10. The hub sections 8 are of identical construction and each opposing face thereof is provided with a circular series of V-shaped sockets 11 having the apices thereof directed toward the axis of the bearings 9 while the outer ends of the V-shaped openings 11 are formed with semi-circular threaded socket portions 12 which, when the hub sections 8 are assembled as shown in Fig. 3 present internally threaded circular sockets.

The spokes of the wheel include tubular sections 13 externally threaded at their inner ends to be received in the threaded sockets 12 in the hub and held immovable relative thereto while the outer ends of the tubular spokes 13 have telescopically received therein inwardly projecting tubular sockets 14 carried by enlarged base portions 15 of the spoke shoes 16. While the base portions 15 have laterally projecting sides 17 as shown more clearly in Figs. 2, 3, for purposes presently to appear. A spoke rod 18 is received in each tubular spoke 13 and has a wedge-shaped block 19 upon its inner end to be received in the wedge-shaped socket 11 provided in the hub 8 and with the tubular spoke 13 secured in the socket 12 until the inner end thereof engages the wedge block 19, the said block is held immovable relative thereto. The rod 18 projects outwardly of the tubular spoke 13 and slidably projects through a piston head or block 20 that is slidably received in the tubular socket 14, the piston head 20 being normally held at the limit of its outward movement as shown in Figs. 1 and 3 by the expansion of the coil spring 21 surrounding the spoke rod 18 and extending between the outer edge of the wedge head 19 and said piston head 20, the piston head engaging at its outer end a shoulder 22 upon the enlarged spoke base 15 of the spoke shoe, there being provided as shown in Fig. 1, a recess 23 in said base 15 to permit a limited movement of the spoke rod into the said base upon the flattening of a portion of the tire adjacent the spoke beneath the axle when under pressure.

A tire 24 of elastic material is associated with the outer ends of said spokes and has embedded therein spoke shoe engaging plates 25 that have openings therein into which the rubber of the tire is embedded, the plates 25 being curved coincident to the curvature of the tire and arranged to expose their faces inwardly thereof and in constant engagement with the spoke shoes 16. As illustrated in Fig. 1, the adjacent ends of the separate spoke shoes 16 are separated as indicated at 26 so that during operation of the wheel, slight circumferential movement of said shoes upon the plates 25 is permitted, attention also being called to the fact, as illustrated in Figs. 2 and 3, to the flanges 17 extending laterally of the shoes 16 coöperating with the lateral edges of the plates 25 substantially to form a guide recess between which adjacent portions of the rubber tire extend.

From the above detail description of the invention, it is thought that the construction and operation thereof will be at once apparent, it being noted that during operation thereof, the spokes 13 will telescope upon the tubular sockets 14 to cause the spoke rods 18 to move outwardly into the recesses 23 when the spokes are positioned beneath the hub 9 and that circumferential strains upon the tread surface 24 will permit a slight circumferential movement of the wheel engaging shoes relative to the tread plates 25 so that in addition to resilient spokes being provided, the tire of the wheel is also permitted to have a slight circumferential movement at right angles to the outer ends of the spokes.

What I claim as new is:

1. A spring wheel comprising a two-part hub section, wedge-shaped sockets formed therein, threaded openings at the outer ends of said sockets, tubular spoke members threaded into said openings, spoke shoes associated with the outer ends of the tubular spokes, a spoke rod within each tubular spoke, a wedge-shaped block upon the inner end of each rod positioned in the adjacent wedge-shaped socket in the hub and held against relative movement by engagement with the adjacent end of the tubular spoke inclosing same, a piston head upon the outer end of each spoke rod, each spoke shoe having an opening therein to receive the extended end of the spoke rod, an expansion spring surrounding each spoke rod extending between the wedge block and the piston head and a rubber tire associated with the outer ends of said spokes.

2. A spring wheel comprising a hub section, tubular spokes carried thereby, a spoke rod arranged in each tubular spoke, a block upon the inner end of each rod adapted to be engaged by the inner end of said spoke to hold the same in fixed position relative to said hub and tubular spoke, a piston head shiftable on each rod, a spring surrounding each rod between the block and piston head, a spoke shoe movably carried by the outer end of said tubular spoke and a cushion tire associated with the outer ends of said spoke shoes.

In testimony whereof I affix my signature.

GEORGI E. WASON.